(12) United States Patent
Hoeing et al.

(10) Patent No.: US 8,998,247 B2
(45) Date of Patent: Apr. 7, 2015

(54) AIRBAG COVER WITH AT LEAST ONE FLAP

(71) Applicants: Maik Hoeing, Gescher (DE); Albert Roring, Gronau-Epe (DE); Rembert Schulze Wehninck, Munich (DE)

(72) Inventors: Maik Hoeing, Gescher (DE); Albert Roring, Gronau-Epe (DE); Rembert Schulze Wehninck, Munich (DE)

(73) Assignee: K. L. Kaschier-und Laminier GmbH, Bad Bentheim-Gildehaus (DE)

( * ) Notice: Subject to any disclaimer, the term of this patent is extended or adjusted under 35 U.S.C. 154(b) by 8 days.

(21) Appl. No.: 14/064,652

(22) Filed: Oct. 28, 2013

(65) Prior Publication Data

US 2014/0120285 A1    May 1, 2014

(30) Foreign Application Priority Data

Oct. 31, 2012    (DE) .......................... 10 2012 021 313

(51) Int. Cl.
*B60R 21/20*    (2011.01)
*B29C 53/04*    (2006.01)
*B60R 21/215*    (2011.01)

(52) U.S. Cl.
CPC ............. *B29C 53/04* (2013.01); *B60R 21/215* (2013.01); *B60R 2021/21537* (2013.01)

(58) Field of Classification Search
CPC ...... B29C 51/12; B29C 45/00; B60R 21/215; B60R 21/276; B60R 21/217; B60R 21/20; D06N 3/121; D06N 3/123; D06N 7/00; D06N 2211/20; D06N 2211/26; D06N 2211/268; B32B 1/02; B32B 1/08; B32B 5/02; B32B 5/022; B32B 5/024; B32B 5/028
USPC ............. 280/728.1, 732, 743.1, 728.2, 728.3, 280/743.2; 428/34.1, 34.3, 34.5, 34.6, 34.7, 428/35.7, 36.1, 105; 442/182, 183, 184, 442/185, 186, 286, 290, 394, 398, 76
See application file for complete search history.

(56) References Cited

U.S. PATENT DOCUMENTS

| | | | |
|---|---|---|---|
| 7,866,688 B2 * | 1/2011 | Basten | 280/729 |
| 8,348,303 B1 | 1/2013 | Roring | |
| 8,822,357 B2 * | 9/2014 | Breed et al. | 442/185 |
| 2004/0247856 A1 | 12/2004 | Sikorski et al. | |
| 2010/0117339 A1 | 5/2010 | Roring | |

FOREIGN PATENT DOCUMENTS

| | | |
|---|---|---|
| DE | 102004010643 A | 10/2005 |
| EP | 1815977 A1 | 8/2007 |
| EP | 2096006 A | 9/2009 |
| WO | 02/066298 A1 | 8/2002 |

* cited by examiner

*Primary Examiner* — Arti Singh-Pandey
(74) *Attorney, Agent, or Firm* — Andrew Wilford

(57) ABSTRACT

An airbag enclosure has a cover formed by a rigid panel having a portion forming a flap defined by a plurality of sides all formed as breakaway lines and one of which also forms a hinge. The cover is made of a thermoplastic laminate that has a plurality of first layers alternating with a plurality of second layers. The first layers each consist of a homogenous thermoplastic film of a polyolefin copolymer, polyester, or a polyester copolymer. The second layers each consist of an array of strips, fibers, or filaments of polypropylene or polyester.

9 Claims, 2 Drawing Sheets

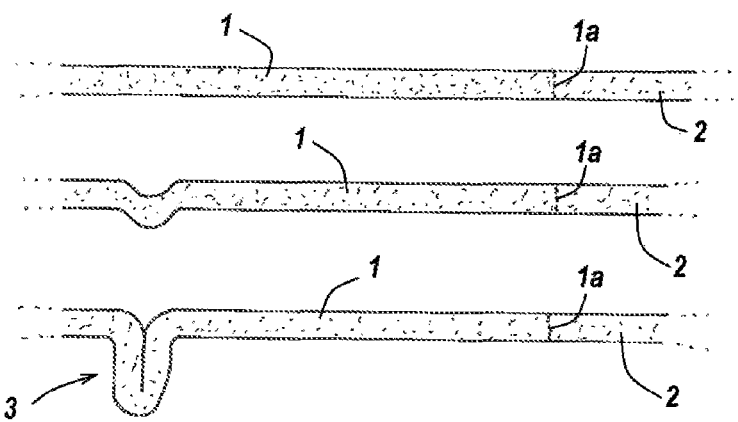
Fig. 4a
Fig. 4b
Fig. 4c
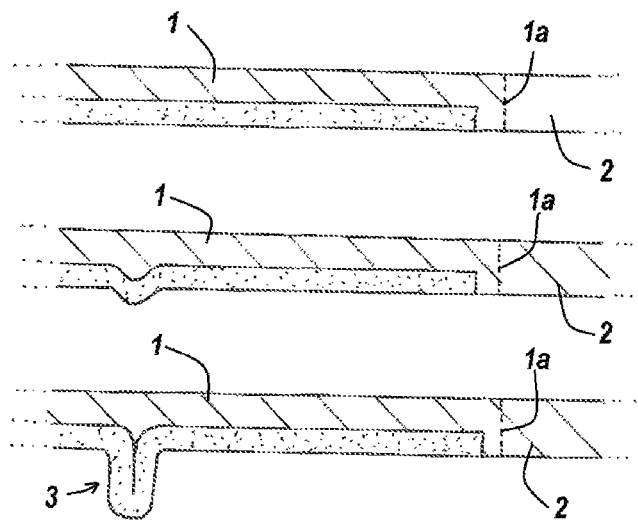
Fig. 5a
Fig. 5b
Fig. 5c
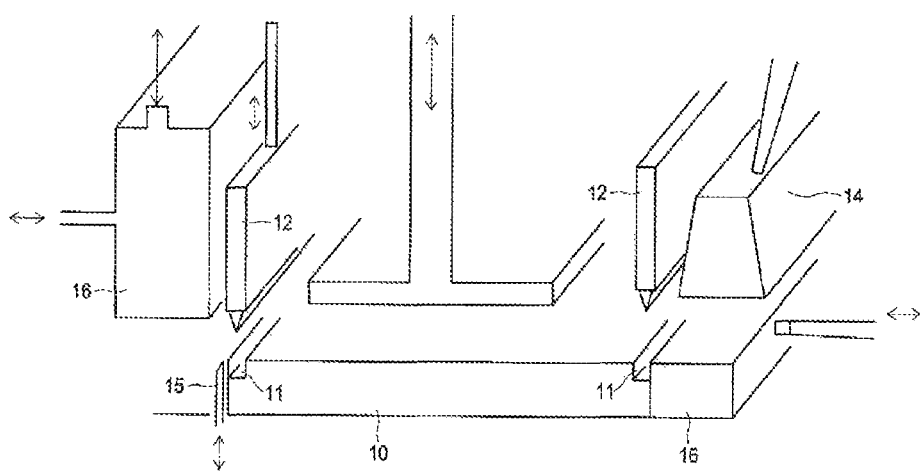
Fig. 6

AIRBAG COVER WITH AT LEAST ONE FLAP

FIELD OF THE INVENTION

The present invention relates to an airbag. More particularly this invention concerns an airbag with at least one flap.

BACKGROUND OF THE INVENTION

A typical airbag assembly comprises an inflatable airbag held in an enclosure having on a cover on a side turned toward the person being protected. This cover in turn has a door or flap that is joined on one edge at a hinge to the rest of the cover but that is connected at its other, usually three, edges to the rest of the cover via weakened tearaway or break lines typically formed by a row of perforations.

In a collision, the airbag is inflated and pushes out the cover, breaking it free along the three break lines and pivoting it at the hinge so the bag can open and deploy in front of its enclosure. The hinge is provided to anchor the flap and prevent it from being propelled outward and potentially injuring the person in front of the airbag assembly.

This secure hold of the flap in the region of the hinge is achieved by additional non-breaking threads in the hinge region, as it is known from U.S. Pat. No. 8,348,303. These known airbag covers are expensive to manufacture.

OBJECTS OF THE INVENTION

It is therefore an object of the present invention to provide an improved airbag cover with at least one flap.

Another object is the provision of such an improved airbag cover with at least one pivotally openable flap that overcomes the above-given disadvantages, in particular whose manufacture is simple and inexpensive.

SUMMARY OF THE INVENTION

An airbag enclosure has a cover formed by a rigid panel having a portion forming a flap defined by a plurality of sides all formed as breakaway lines and one of which also forms a hinge. The cover is made of a thermoplastic laminate that has a plurality of first layers alternating with a plurality of second layers. The first layers each consist of a homogenous thermoplastic film of a polyolefin copolymer, polyester, or a polyester copolymer. The second layers each consist of an array of strips, fibers, or filaments of polypropylene or polyester.

The structure preferably is a "single-type system", i.e. the film layers and the reinforcement layers are always made of the same basic chemical substance. However, a "mixture" of polypropylene film and polyester reinforcements or vice versa is also possible.

Such an airbag cover can be produced in a simple manner since it consists of only one type of material. Further materials do not need to be incorporated. In particular, it is not necessary to incorporate further materials in the form of threads or fabrics. In particular, it is not necessary to provide the material of the cover in the region of the hinge with additional threads or specially formed threads. In this way, the cover according to the invention has a low weight, is thermally deformable, has high fracture and impact strength, is resistant to aggressive fluids and is very abrasion-resistant. The material is also environmentally friendly since it is recyclable.

The array according to the invention is a weave or a nonwoven.

The second layers are folded at the hinge, and the laminate has a face bonded to a thermoplastic film of polyester or polypropylene. It also has a face in which glass fibers are imbedded.

A fold is formed in such a laminate by supporting the laminate and pressing a hot blade into the laminate. In addition the laminate can be preheated before pressing the hot blade into it.

Sufficient strength while maintaining easy processability is achieved if the polypropylene or polyester material of the multi-layer cover has a total thickness of from 0.35 to 3 mm. Also, it is advantageous if the material of the laminated cover has at least two layers, the outermost layer consisting of both a film and the reinforcement material.

In order to achieve sufficient mobility of the flap in the region of the hinge without causing the flap to break in the hinge region, the polypropylene or polyester material of the laminated cover form in the region of the hinge at least one fold, groove and/or tuck that extends along the hinge.

In order to fasten and hold the material of the cover in a secure manner on an substrate and/or on the material of the cover and/or a cover, it is proposed that the upper side and/or the lower side of the material of the cover is laminated with a thermoplastic film, in particular of polyester or polypropylene. As an alternative to this it is proposed that the upper side and/or the lower side of the material of the cover is laminated with a nonwoven glass fiber material or a glass fiber fabric.

BRIEF DESCRIPTION OF THE DRAWING

The above and other objects, features, and advantages will become more readily apparent from the following description, reference being made to the accompanying drawing in which:

FIGS. 4a-4c are detail views illustrating successive steps in the manufacture of the airbag cover of this invention;

FIG. 5a-5c are views like FIGS. 4a-c showing the manufacture of another AIRBAG in accordance with the invention; and FIG. 6 is a schematic view of an apparatus for making the cover.

SPECIFIC DESCRIPTION OF THE INVENTION

Figure 1:
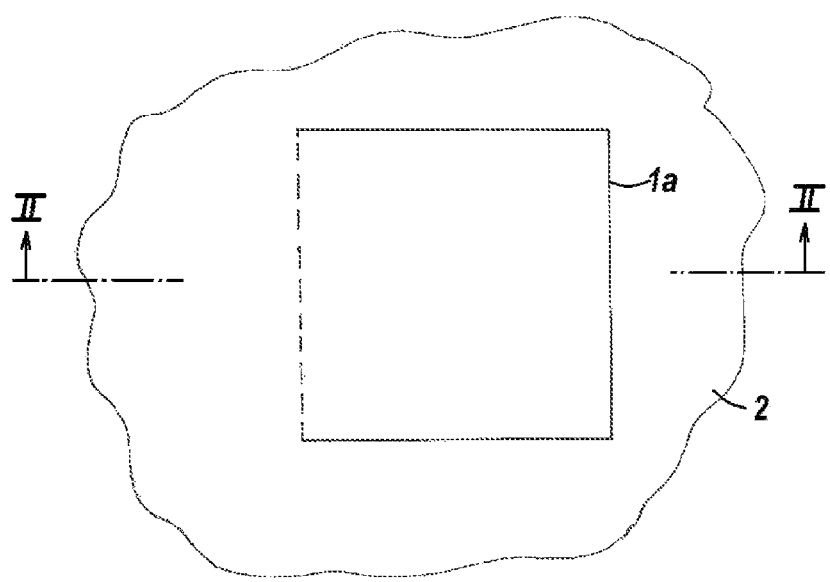
FIG. 1 is a top view of a detail of an airbag cover according to the invention.
Figure 2:
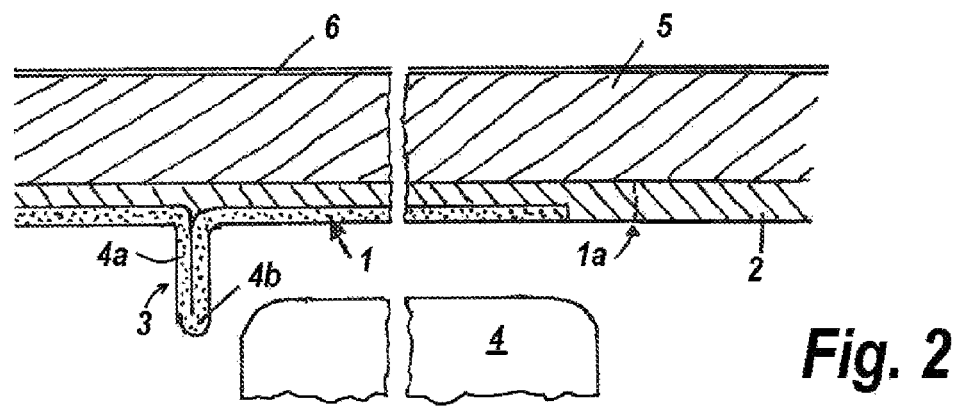
FIG. 2 is a section taken along line II-II of FIG. 1.

As seen in FIGS. 1 and 2 an airbag cover has a rectangular flap 1 formed initially as part of a panel 2 covering an airbag 4 and formed with break lines 1a along at least three sides of the flap 1, the fourth side of which is provided with a hinge formed by a fold 3 having two sides 4a and 4b. In use, activation of the airbag 4 causes it to blow out the flap 1 by fracturing the panel 2 at the fold 3, causing it to pivot by stretching out the fold 3 so the flap 1 stays attached to the cover panel 2.

Figure 3:
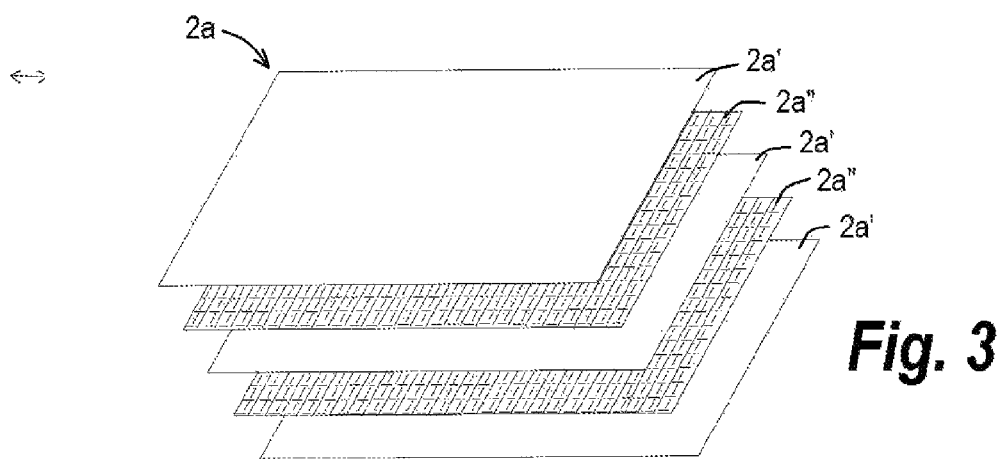
FIG. 3 is an exploded view of the laminate forming the cover.

The panel 2 is a rigid and/or stiff plate-shaped laminate and therefore is a relatively thin, flat, planar and solid article that has the same thickness all around and limited elasticity (in contrast to a film). Here as shown in FIG. 3 it is made of a laminate 2a that comprises first layers 2a' of a homogenous thermoplastic film, here polypropylene, a polyolefin copolymer, a polyester copolymer, or polyester. These layers 2a' alternate with layers 2a" of polypropylene or polyester strips or filament. Here, the strips arranged in an ordered manner, in particular laid, woven, or knitted like a fabric, or they are arranged criss-cross in a disordered manner like a nonwoven. There are at least two, in particular three to eight layers at a total thickness of from 0.35 mm to 3 mm. By applying pressure and supplying heat, all the layers 2a' and 2a'' melt together to form a single plate that consists only of polypropylene or polyester layers.

In alternative embodiments, the further reinforcement layers between or on the film layers comprise, instead of the straps, fibers or filaments that again consist of polypropylene or polyester films and are arranged in an ordered (as a knitted or woven fabric) or disordered (as a nonwoven) manner.

Here the cover 2 is embedded in the lower side of a plastic layer 5, in particular an injection-molded layer of polypropylene with glass fibers) and the break line la does not extend into the layer 5.

Security against breaking is increased in that the fold, groove, or tuck 3 that forms in the hinge along the longitudinal extent of the hinge or the flap edge provides additional material length transverse to the longitudinal extent of the hinge. This additional material length in the hinge region provides for sufficient path length when pivoting the flap 1 about the hinge so that it is ensured that the flap 1 does not break off.

In a further embodiment, in a first alternative, the upper side and/or the lower side of the material of the cover is laminated with a thermoplastic film 6, in particular of polyester or polypropylene. In a second alternative, the upper side and/or the lower side of the material of the cover is laminated with a nonwoven glass fiber material or a glass fiber fabric.

FIGS. 4a-c show a break line la that is in the flap, whereas FIGS. 5a-c show the break line extending through the panel adjacent the flap 1 for forming a bigger hole with the flap 1 is broken out. Either way as indicated in FIG. 1 the break line 1a need not extend through the outer layers 5 and/or 6, as these are typically provided by the end user and can be easily fractured when the flap 1 is blown out by the standard explosive expansion of the airbag 4.

As shown in FIG. 4ac, 5a-c and 6, for making the fold, groove, or tuck, a heated blade 12 is used that is pressed into the plate in the region of the hinge and thereby deforms the thermoplastic material so that the material can in addition be heated partially or over the entire surface prior to deforming.

To this end the plate 2 is held down on a support 10 by clamp bars 14 and the heated blades 12 push the material of the panel down into grooves 11. A secondary blade 15 can be provided to make a W- or M-shaped groove. Secondary clamp bars 16 can push the plate together as the fold 3 is being formed.

We claim:

1. In combination with an airbag enclosure having a cover formed by a rigid panel having a portion forming a flap defined by a plurality of sides all formed as breakaway lines and one of which also forms a hinge, the cover being made of a thermoplastic laminate that has a plurality of first layers alternating with a plurality of second layers, the first layers each consisting of a homogenous thermoplastic film of a polyolefin copolymer, polyester, or a polyester copolymer, the second layers each consisting of an array of strips, fibers, or filaments of polypropylene or polyester.

2. The combination defined in claim 1, wherein the array is a weave.

3. The airbag cover defined in claim 1, wherein the laminate has a face bonded to a thermoplastic film of polyester or polypropylene.

4. The airbag cover defined in claim 1, wherein the laminate has a thickness of 0.35 mm to 3 mm.

5. The airbag cover defined in claim 1, wherein the second layers are folded at the hinge.

6. The airbag cover defined in claim 3, wherein the array is a nonwoven.

7. The airbag cover defined in claim 1, wherein the laminate has a face in which glass fibers are imbedded.

8. A method of forming a fold in a laminate having a plurality of first layers alternating with a plurality of second layers, the first layers each consisting of a homogenous thermoplastic film of a polyolefin copolymer, polyester, or a polyester copolymer, the second layers each consisting of an array of strips or filaments of polypropylene or polyester, the method comprising the step of:
supporting the laminate and pressing a hot blade into the laminate.

9. The method defined in claim 8, further comprising the step of at least partially preheating the laminate before pressing the hot blade into it.

* * * * *